US012650281B2

(12) United States Patent
Gwak

(10) Patent No.: US 12,650,281 B2
(45) Date of Patent: Jun. 9, 2026

(54) SYSTEM AND METHOD FOR IMPROVING SHOOTING ACCURACY AND PREDICTING SHOOTING HIT RATE

(71) Applicant: HANWHA AEROSPACE CO., LTD., Changwon-si (KR)

(72) Inventor: Young Cheon Gwak, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 158 days.

(21) Appl. No.: 18/593,236

(22) Filed: Mar. 1, 2024

(65) Prior Publication Data

US 2024/0295385 A1 Sep. 5, 2024

(30) Foreign Application Priority Data

Mar. 2, 2023 (KR) ........................ 10-2023-0027653

(51) Int. Cl.
*F41G 3/08* (2006.01)
*G06N 3/045* (2023.01)
(52) U.S. Cl.
CPC .............. *F41G 3/08* (2013.01); *G06N 3/045* (2023.01)
(58) Field of Classification Search
CPC .................................. F41G 3/08; G06N 3/045

USPC .......................................................... 235/404
See application file for complete search history.

(56) References Cited

U.S. PATENT DOCUMENTS

| | | | |
|---|---|---|---|
| 11,629,934 B2 * | 4/2023 | Sitrick .................... | F41G 3/165 235/404 |
| 12,007,203 B1 * | 6/2024 | Archer .................... | F41G 3/165 |
| 2022/0057519 A1 * | 2/2022 | Goldstein ............... | G01S 17/88 |
| 2023/0069140 A1 * | 3/2023 | Kalluri ................ | F02D 41/0087 |

FOREIGN PATENT DOCUMENTS

| | | |
|---|---|---|
| KR | 10-1146942 B1 | 5/2012 |
| KR | 10-2021-0109356 A | 9/2021 |

* cited by examiner

*Primary Examiner* — Daniel A Hess
(74) *Attorney, Agent, or Firm* — Sughrue Mion, PLLC

(57) ABSTRACT

A system includes a shooting system comprising at least one first processor configured to: receive shooting ballistics-related data and shooting result data in real time; and detect real-time surrounding data; and an integrated computer comprising at least one second processor configured to: receive the shooting ballistics-related data and the shooting result data from the shooting system; derive learning result data based on the shooting ballistics-related data and the shooting result data; and transmit the learning result data to the shooting system.

20 Claims, 9 Drawing Sheets

Figure 6:
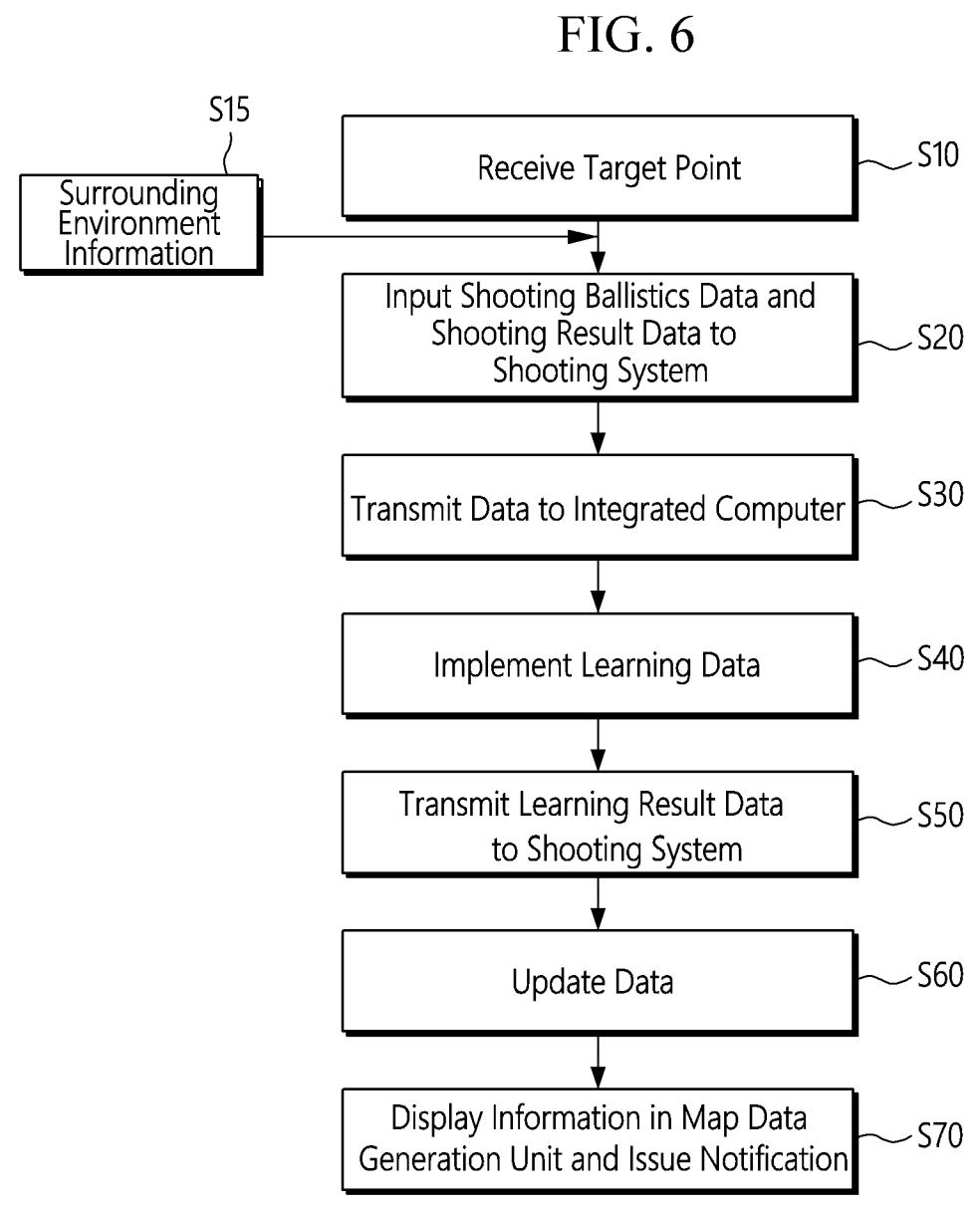

Surrounding
Environment
Information

Receive Target Point — S10

Input Shooting Ballistics Data and
Shooting Result Data to
Shooting System — S20

Transmit Data to Integrated Computer — S30

Implement Learning Data — S40

Transmit Learning Result Data
to Shooting System — S50

Update Data — S60

Display Information in Map Data
Generation Unit and Issue Notification — S70

SYSTEM AND METHOD FOR IMPROVING SHOOTING ACCURACY AND PREDICTING SHOOTING HIT RATE

CROSS-REFERENCE TO RELATED APPLICATION

This application claims priority from Korean Patent Application No. 10-2023-0027653 filed on Mar. 2, 2023 in the Korean Intellectual Property Office, and all the benefits accruing therefrom under 35 U.S.C. 119, the contents of which in its entirety are herein incorporated by reference.

BACKGROUND

1. Field

The disclosure relates to a system and method for improving shooting accuracy and predicting shooting hit rate. The system and method for improving shooting accuracy and predicting shooting hit rate can improve shooting accuracy by executing a learning algorithm using shooting data and shooting result data from at least one shooting system, and predict the shooting hit rate of a shooting event in a current surrounding environment and provide the results of the prediction to an operator.

2. Description of Related Art

The shooting hit rate for turrets, mounted firearms, or other fire weapon systems (or shooting systems) is provided to the users. In such a fire weapon system, shots are based on a firing table, with the first shot being fired accordingly. After the firing of the first shot, subsequent shots are fired in a manner that reflects adjustments based on the measured distance between the target point and the point of impact of the first shot.

However, after the first shot, the shooting hit rate may significantly decrease due to enemy responses, and even though the shooting parameters and adjustments are automatically determined by the automatic fire control device, the hit rate of the firearm is still not high.

Conventionally, while the shooting hit rate for turrets, mounted firearms, or fire weapon systems (or shooting equipment) is provided to the users, there is no proper technology to improve shooting accuracy according to the current situation, or predict and provide shooting hit rate suitable for the current situation.

Therefore, there is a demand for a system and method that can learn and improve the shooting accuracy of a shooting system in real-time and simultaneously predict and provide the shooting hit rate to an operator.

SUMMARY

To address the aforementioned problem, provided is a system and method for improving shooting accuracy and predicting shooting hit rate for a shooting system such as, but not limited to, a mobile remote weaponry, which can conduct learning through real-time shooting input and shooting result data and can enhance shooting accuracy by transmitting learned shooting results to the shooting system to correct ballistic values.

To address the aforementioned problem, provided is a system and method for improving shooting accuracy and predicting shooting hit rate, which can improve shooting accuracy in real time and on a real-time movement path, predict shooting hit rate in a current situation and on the real-time movement path, providing the results of the prediction to an operator, and learn and improve the shooting accuracy of a shooting system.

Additional aspects will be set forth in part in the description which follows and, in part, will be apparent from the description, or may be learned by practice of the presented embodiments.

According to an aspect of the disclosure, a system includes: a shooting system which may include at least one first processor which may be configured to: receive shooting ballistics-related data and shooting result data in real time; and detect real-time surrounding data, and an integrated computer which may include at least one second processor which may be configured to: receive the shooting ballistics-related data and the shooting result data from the shooting system; derive learning result data based on the shooting ballistics-related data and the shooting result data; and transmit the learning result data to the shooting system, wherein the at least one first processor may implement a neural network which may be configured to store and derive a shooting control data and a shooting prediction data and shooting prediction data based on the shooting ballistics-related data, the shooting result data, and the learning result data, wherein the at least one second processor may be further configured to update the learning result data based on the shooting ballistics-related data and the shooting result data received from the shooting system, wherein the at least one second processor may be further configured to transmit the updated learning result data to the shooting system, wherein the at least one first processor may be further configured to update the shooting ballistics-related data based on the updated learning result data received from the integrated computer, and wherein the at least one first processor may be further configured to update the shooting control data and the shooting prediction data of the neural network based on the updated learning result data received from the integrated computer.

The at least one second processor may be further configured to implement learning based on the shooting ballistics-related data and the shooting result data received from the shooting system, and the learning implemented by the at least one second processor may include shooting control learning for enhancing a shooting accuracy of the shooting system and a shooting prediction learning for enhancing a real-time shooting hit rate of the shooting system.

The shooting prediction learning of the shooting system may include a ballistic state of the shooting system and a posture status, position status, situation status, deployment status, and ballistic correction angle status of the at least one shooting system based on the real-time surrounding data.

The at least one first processor may be configured to increase the shooting accuracy toward a target point and predict the real-time shooting hit rate by updating the shooting ballistics-related data and the one shooting result data with the updated learning result data received from the integrated computer, and transmit, to an operator, a prediction value data based one the updated shooting ballistics-related data and the updated shooting result data.

The shooting system and the integrated computer may both include a shooting control algorithm and a shooting prediction algorithm, the receiving, transmitting, and updating of the shooting ballistics-related data, the shooting result data in real time, and the learning result data by the shooting system and the integrated computer is done in real time, the shooting control algorithm of the shooting system and the integrated computer may be configured to perform the shooting control learning based on the receiving, transmitting, and updating the shooting ballistics-related data, the shooting result data, and the learning result data in real time, and the shooting prediction algorithm of the shooting system and the integrated computer may be configured to perform the shooting prediction learning based on the receiving, transmitting, and updating the shooting ballistics-related data, the shooting result data, and the learning result data in real time.

The shooting control algorithm may include a shooting control local neural network part, which may be provided in the local neural network of the shooting system and to which the shooting control data is input, and a shooting control global neural network part, which may be provided in the global neural network of the integrated computer, may be configured to receive and learn from the shooting control data inputted to the shooting control local neural network part, and extract the learning result data, wherein the shooting control algorithm may be configured to update the shooting control data input to the shooting control global neural network part based on the learning result data and may be configured to reflect the updated shooting control data in real time.

The shooting system may be equipped with a driving part which may be configured to adjust the shooting of the shooting system, wherein the driving part may be configured to be operated and controlled based on the updated shooting control data of the shooting control local neural network part and ballistic correction angle status of the shooting system, and wherein the shooting system may be adjusted toward the target point according to the operation of the driving part.

The shooting control data input to the shooting control local neural network part may include at least one of tracking image data, raw data from among the tracking image data, distance data, ballistic correction angle data, N-axis motor position data, navigational data, gyro data, or ground surface condition information, wherein the shooting control local neural network part may be configured to transmit the shooting control data, wherein the shooting control global neural network part may include a glob input layer which may be configured to receive the raw data from the shooting control local neural network part, at least one global hidden layer, which may be connected to the global input layer through a plurality of neural networks, and a global output layer, which may be connected to the at least one global hidden layer through the plurality of neural networks, which may be configured to learn the learning result data through the at least one global hidden layer and output the learning result data to the at least one first processor, and wherein the at least one first processor may be configured to download the learning result data from the global output layer and update the learning result data as the raw data.

The shooting prediction algorithm may include a shooting prediction local neural network part, which may be provided in the local neural network of the shooting system and to which the shooting prediction data is input, and a shooting prediction global neural network part, which may be provided in the global neural network of the integrated computer, which may be configured to receive and learn from the shooting prediction data input to the shooting prediction local neural network part, and extract the learning result data, the shooting prediction algorithm may be configured to update the shooting prediction data input to the shooting prediction global neural network part based on the learning result data and may be configured to reflect the updated shooting prediction data in real time.

The shooting prediction data input to the shooting prediction local neural network part may include at least one of tracking image data, raw data from among tracking image data, distance data, ballistic correction angle data, N-axis motor position data, navigational data, gyro data, or ground surface condition information, the shooting prediction local neural network part may be configured to transmit the shooting prediction data, the shooting prediction global neural network part may include a global input layer which may be configured to receive the raw data from the shooting prediction local neural network part and store the received raw data, at least one global hidden layer, which may be connected to the global input layer through a plurality of neural networks, and a global output layer, which may be connected to the at least one global hidden layer through the plurality of neural networks, which may be configured to learn the learning result data, which is based on the raw data, through the at least one global hidden layer and output the learned learning result data, wherein the at least one first processor may be configured to download the learning result data which is output from the global output layer and update the learning result data output as the raw data.

The shooting system may further include a Light Detection and Ranging (LiDAR) sensor and an environmental sensor, which both may be configured to detect surrounding environment data of the shooting system.

The at least one second processor may be configured to implement a map data generation unit which may be configured to receive the surrounding environment data from the LiDAR sensor and generate surrounding environment information that ranges up to a target point, and a movement path analysis unit which may be configured to generate and analyze at least one movement path of the at least one shooting system to the target point based on the generated surrounding environment information generated by the map data generation unit.

The at least one first processor may be configured to transmit the surrounding environment data and a position information about the shooting system to the integrated computer, the at least one second processor may be further configured to generate at least one path for the map data generation unit for the shooting system and the surrounding environment of the target point, and the movement path analysis unit may be configured to analyze the at least one movement path for shooting system and analyze an optimal shooting position based on the learning result data received from the shooting system.

The at least one second processor may be further configured to implement a map generation unit which may be configured to generate the at least one movement path between the shooting system and a target point, and the at least one movement path may include at least one of shooting position information, terrain information, predicted shooting hit rate information, or estimated travel time to the target point based on whether the shooting system is moving or stationary.

According to an embodiment of the disclosure, a method of improving a shooting accuracy and predicting a shooting hit rate may include: receiving a target point; receiving, by a shooting system, data for shooting at the target point; transmitting the data for shooting at the target point received by the shooting system to an integrated computer; deriving, by the integrated computer, a learning result data for shooting control and shooting prediction by learning the data for shooting at the target point transmitted to the integrated computer; transmitting the learning result data from the integrated computer to shooting system; and updating, by the shooting system, the data for shooting at the target point transmitted by the shooting system based on the learning result data and reflecting the updated data for shooting at the target point in the shooting system in real time.

The method may further include, after the receiving the target point, collecting, by a Light Detection and Ranging (LiDAR) sensor of the shooting system, surrounding environment data for a current position of the shooting system and generating, by the integrated computer and based on the surrounding environment data, at least one movement path for the at least one shooting system and analyzing the at least one movement path to the target point.

The method may further include, after the updating the data for shooting at the target point transmitted by the shooting system and the reflecting the updated data for shooting at the target point in the shooting system in real time, displaying, on the at least one movement path, at least one of shooting position information, terrain information, predicted shooting hit rate information, or estimated travel time to the target point based on whether the shooting system is moving or stationary.

The method may further include receiving shooting result data by the shooting system, transmitting the shooting result data to the integrated computer, deriving, by the integrated computer, the learning result data for shooting control and shooting prediction by learning the shooting result data transmitted to the integrated computer, transmitting the learning result data based one the shooting result data from the integrated computer to the shooting system, and updating, by the shooting system, the data for shooting at the target point transmitted by the shooting system based on the learning result data learned from the shooting result data, and reflecting the updated data in the shooting system in real time.

The learning result data for shooting control and shooting prediction may include at least one of tracking image data, raw data from among the tracking image data, distance data, ballistic correction angle data, N-axis motor position data, navigational data, gyro data, or ground surface condition information.

The method may further include detecting real-time surrounding data, the data and the shooting result data may each include a ballistic state of the shooting system and a posture status, position status, situation status, deployment status, and ballistic correction angle status of the shooting system based on the real-time surrounding data.

BRIEF DESCRIPTION OF DRAWINGS

The above and other aspects, features, and advantages of certain embodiments of the present disclosure will become more apparent from the following description taken in conjunction with the accompanying drawings, in which:

FIG. 1 is a diagram illustrating a system for improving shooting accuracy and predicting shooting hit rate according to one or more embodiments;

FIG. 2B is a configuration view illustrating an operation of the data algorithm of the system according to one or more embodiments;

FIG. 3 is a schematic configuration view illustrating the generation of the map data generation unit and the generation and analysis of a movement path through the LiDAR sensors according to one or more embodiments;

FIG. 4B is a drawing illustrating how the integrated computer of the system predicts shooting hit rate at a fixed or moving position of each shooting system according to one or more embodiments;

FIG. 4C is a drawing illustrating how the integrated computer of the system derives result data using the global neural network part and the local neural network part according to one or more embodiments;

FIG. 6 is a schematic flowchart illustrating a method of improving shooting accuracy according to one or more embodiments.

DETAILED DESCRIPTION

Figure 2A:
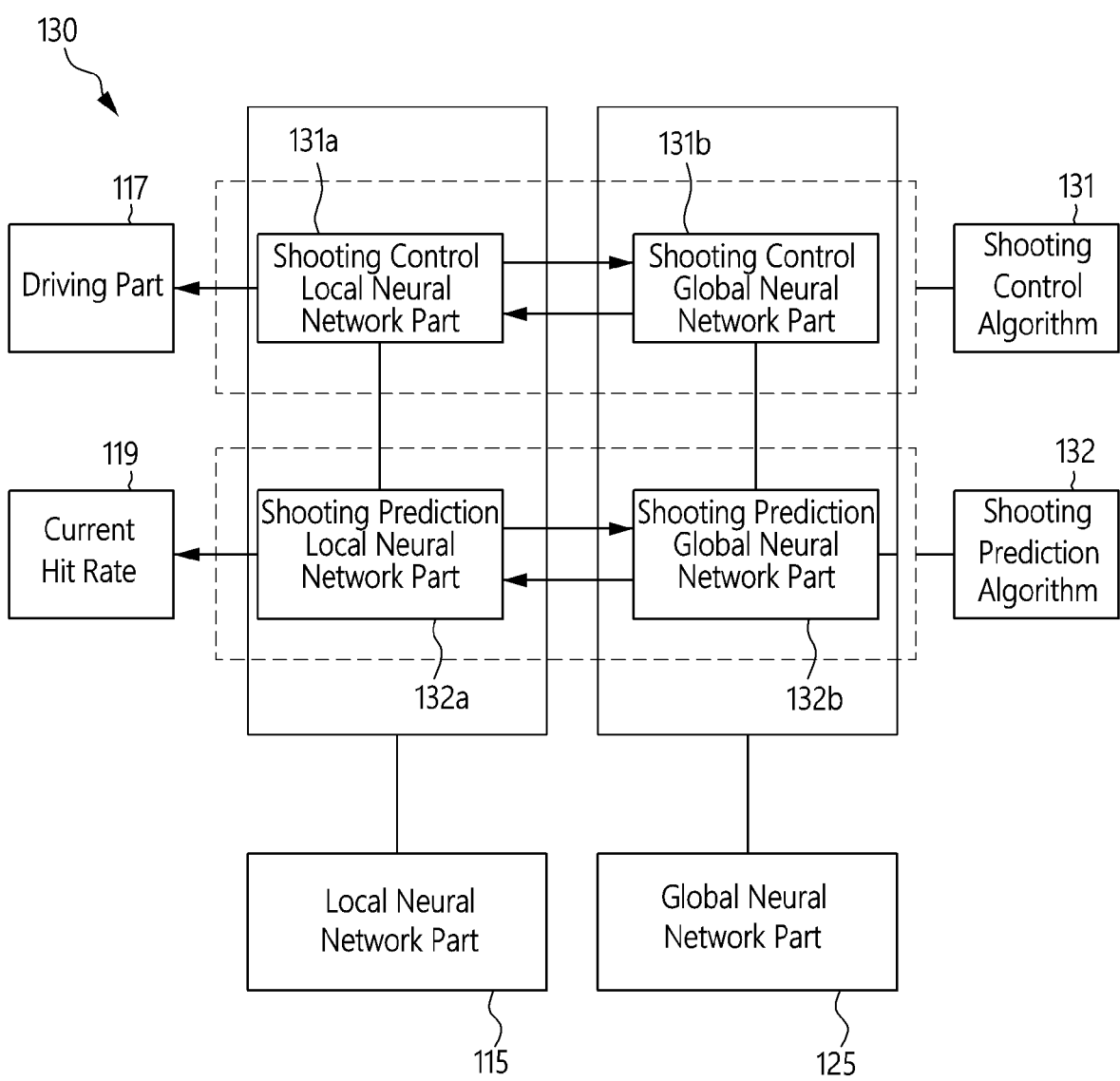
FIG. 2A is a schematic diagram illustrating the data algorithm of the system according to one or more embodiments.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, one or more embodiments of the present disclosure will be described in detail with reference to the accompanying drawings.

An apparatus and method for improving shooting accuracy according to embodiments of the present disclosure will hereinafter be described with reference to the accompanying drawings.

Figure 1:
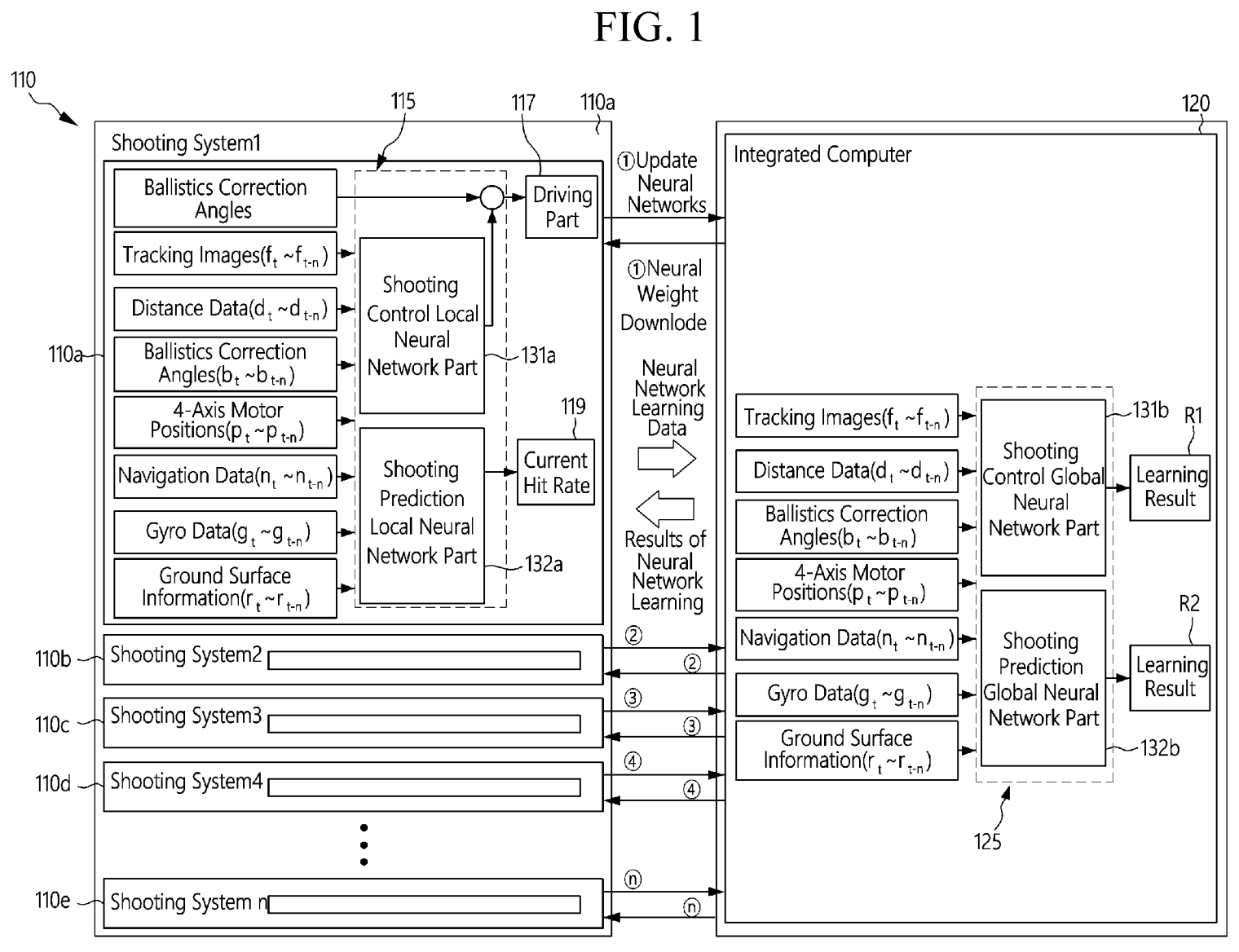

FIG. 1 is a diagram illustrating a system 100 for improving shooting accuracy and predicting shooting hit rate according to one or more embodiments.

Referring to FIG. 1, the system 100 may include one or more shooting systems 110 and an integrated computer 120. As will be described, the system 100 may include a data algorithm 130 (see FIG. 2A) to enhance shooting accuracy and the prediction of shooting hit rate. Additionally, the system 100 may include configurations for securing information on shooting hit rate at a particular position on a movement path between the position of the shooting systems 110 and a target point. The information on shooting hit rate at a particular position on a movement path between the position of the shooting systems 110 and a target point, for whether the shooting systems 110 are stationary or moving, may be obtained by a Light Detection and Ranging (LiDAR) sensor 1121, an environmental sensor 1122, a map data generation unit 121, and a movement path analysis unit 122.

The system 100 may include a display module which may visually provide information to the outside (e.g., a user) of the system 100. The display module may include a display, a hologram device, or a projector and control circuitry to control a corresponding one of the display, hologram device, and projector. The display module may include touch circuitry (e.g., a touch sensor) adapted to detect a touch, or sensor circuitry (e.g., a pressure sensor) adapted to measure the intensity of force incurred by the touch.

According to one or more embodiments, the system 100 is configured to allow the integrated computer 120 to execute a learning algorithm using data related to the surrounding environment (i.e. real time surrounding data) of the shooting systems 110 and at least one shooting ballistics data and shooting results data. To provide an improved shooting accuracy and shooting hit rate to an operator, the system 100 is further configured to continuously update learned data through the learning algorithm, enhance (or raise) shooting accuracy, and predict the shooting hit rate suitable for a current situation (i.e. prediction value data).

The integrated computer 120, which controls the shooting systems 110, progresses with learning. The shooting devices (e.g., a remote armament device) equipped in the shooting systems 110 use learning result data (i.e., learning results R1 and R2) from the integrated computer 120 so that as learning progresses, shooting accuracy improves over time and a higher shooting hit rate is secured.

One or more shooting systems 110, e.g., shooting systems 110a through 110n, may be provided in the system 100. Each of the shooting systems 110 may be configured to receive at least one shooting ballistics data, receive real-time shooting result data in real time, and detect real-time surroundings data.

The more shooting systems 110 there are, the more data can be secured from the shooting systems 110. The more data secured from the shooting systems 110, the more data can be transmitted to the integrated computer 120, which will be described later. The integrated computer 120 may perform its own learning process by integrating received (or downloaded) data, and learning result data may be transmitted (or downloaded) back to the shooting systems 110. The shooting systems 110 are updated with data received (or downloaded) from the integrated computer 120. As the shooting systems 110 are updated, the shooting accuracy of the shooting systems 110 can be improved, and the shooting hit rate of the shooting systems 110 can be predicted more accurately. As described later, each of the shooting systems 110 may be equipped with a local neural network part 115 for shooting control and prediction. Result data from the local neural network part 115 may be used to output a current hit rate 119 (i.e. current shooting hit rate) and data for the operation of a driving part 117 of the remote armament device of each of the shooting systems 110. The driving part 117 may include at least one of a hydraulic actuator, a hydraulic motor or an electric motor, not being limited thereto.

According to one or more embodiments, the integrated computer 120 may be configured to control one or more shooting systems 110 (e.g. shooting systems 110a through 110n). The integrated computer 120 is configured to transmit data to and receive data from the shooting systems 110, particularly, shooting systems 110a through 110n. The integrated computer 120 receives data from the shooting systems 110 and conducts learning based on the received data. The integrated computer 120 may transmit learning result data results (i.e., the learning results R1 and R2) to the shooting systems 110. The shooting systems 110 may implement updates by reflecting the learning data results received from the integrated computer 120 in their respective data. The integrated computer 120 may be configured to learn on its own from data transmitted from the shooting systems 110, specifically shooting ballistics-related data and shooting result data, as well as various terrain and surrounding environment data.

As will be described, the integrated computer 120 may be equipped with a global neural network part 125, which learns shooting control and prediction from the data received from the shooting systems 110. The global neural network part 125 may learn from the data received from at least one shooting system 110 and derive the learning result data (i.e., the learning results R1 and R2). The learning results R1 and R2 for shooting control and prediction, derived from the integrated computer 120, are downloaded (or transmitted) to the local neural network parts 115 of the shooting systems 110. The downloaded learning results R1 and R2 are reflected into the local neural network parts 115 of the shooting systems 110. From the downloaded learning results R1 and R2, data values of the local neural network parts 115 are updated so that shooting ballistics-related data may be updated to the latest version. Result values output from the local neural network parts 115 that have been updated are reflected in the remote armament devices of the shooting systems 110. As a result, both the real-time shooting accuracy of the shooting systems 110 toward each target and the accuracy of predicted shooting hit rates can be enhanced, and such predicted shooting accuracies and shooting hit rates can be configured to the operator.

According to one or more embodiments, each of the shooting systems 110 and the integrated computer 120 may be physically implemented as one or more processors such as a central processing unit (CPU), an application processor unit (APU), a graphics processing unit (GPU), a neural processing unit (NPU), an image signal processor (ISP), a sensor hub processor, or a communication processor (CP), and a hardware accelerator configured to perform functions and operations described by software or software module stored in one or more memories included therein or an external memory device.

The memory may store various data used by the processors. The various data may include software and input data or output data for a command related thereto. The memory may include the volatile memory or the non-volatile memory or both volatile memory and the non-volatile memory.

The program may be stored in the memory as software, and may include an operating system (OS), middleware, and/or an application.

As mentioned above, the integrated computer 120 may derive the learning result data for shooting control and prediction through its own learning process.

According to one or more embodiments, the integrated computer 120 may be configured to acquire information on the current position of the shooting systems 110 and the target point which may include map data of the current position of the shooting systems 110 and map data of the surroundings of the target point. The integrated computer 120 may be configured to analyze the surrounding environment of the shooting systems 110 and the target point. Through the map data and the results of the analysis of the surrounding environment of the shooting systems 110 and the target point, the integrated computer 120 may be configured to create a movement path between the position of the shooting systems 110 and the target point, calculate information on each region on the movement path and suitable shooting positions, and calculate shooting hit rate.

FIG. 2A is a schematic diagram illustrating the data algorithm 130 of the system 100 according to one or more embodiments.

Figure 2B:
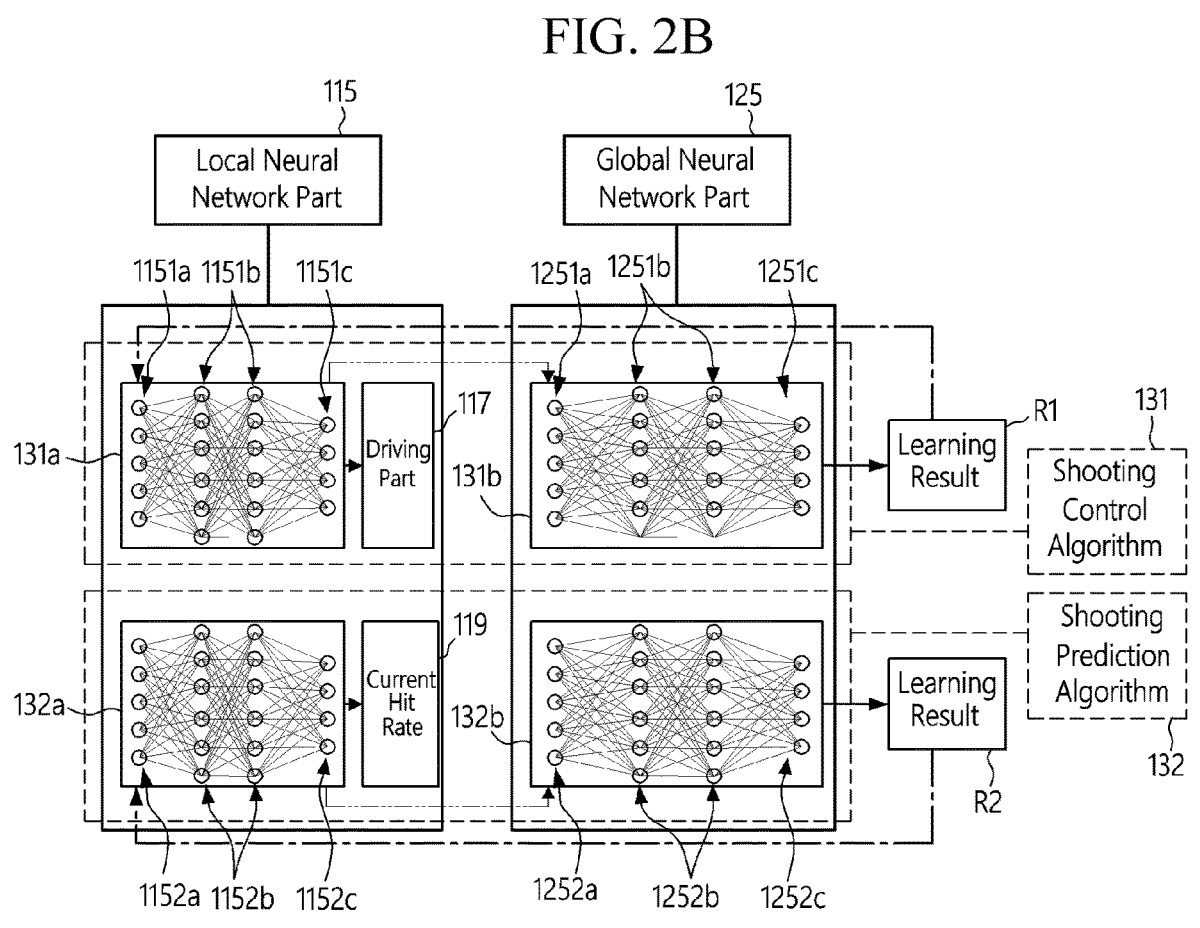

FIG. 2B is a configuration view illustrating an operation of the data algorithm 130 of the system 100 according to one or more embodiments.

Referring to FIGS. 2A and 2B, the system 100 may include the data algorithm 130, which is for enhancing shooting accuracy and predicting shooting hit rate between the integrated computer 120 and each of the shooting systems 110.

The data algorithm 130 may be provided in both the integrated computer 120 and each of the shooting systems 110 to enable data to be transmitted (or downloaded) between the integrated computer 120 and each of the shooting systems 110.

The data algorithm 130 may be classified into two types.

First, the data algorithm 130 may be configured as a local neural network part 115 or a global neural network part 125 depending on its installation position and whether learning is implemented. Second, the data algorithm 130 may be configured as a shooting control algorithm 131 (i.e. shooting control learning algorithm) for improving shooting accuracy through shooting control or a shooting prediction algorithm 132 (i.e. shooting prediction learning algorithm) for predicting shooting hit rate. The shooting prediction learning algorithm 132 may include shooting prediction data.

Due to these two classification types, the data algorithm 130 may include a shooting control local neural network part 131a, a shooting prediction local neural network part 132a, a shooting control global neural network part 131b, and a shooting prediction global neural network part 132b.

The local neural network part 115 may be provided in each of the shooting systems 110. Although the local neural network part 115 does not perform its own learning process, the local neural network part 115 is an algorithm that can derive shooting control and prediction results from input data. The local neural network part 115 may be considered an algorithm for storing input data and driving a shooting based on the input data. The local neural network part 115 may include local input layers 1151a and 1152a, which receive data input from each of the shooting systems 110 or data updated through the integrated computer 120. The local neural network part 115 may include a plurality of local hidden layers 1151b and 1152b, which are connected to the local input layers 1151a and 1152a through a plurality of neural networks, and a local output layer 1151c and 1152c, which is connected to the local hidden layer 1151b and 1152b through a plurality of neural networks. Therefore, the local neural network part 115 may be considered an algorithm that extracts driving values for real-time shooting control for the target point. The local neural network part 115 may also be considered an algorithm that predicts a current shooting hit rate through the neural network connections of the local input layers 1151a and 1152a, the local hidden layers 1151b and 1152b, and the local output layer 1151c and 1152c.

The global neural network part 125 may be provided in the integrated computer 120. The global neural network part 125 is a learning algorithm that performs its own learning process. The global neural network part 125 may include a global input layer 1251a and 1252a, which receives data from each of the shooting systems 110 for its self-learning, at least one global hidden layer 1251b and 1252b, which is connected to the global input layer 1251a and 1252a through a plurality of neural networks to perform learning, and a global output layer 1251c and 1252c, which is connected to the at least one global hidden layer 1251b and 1252b through neural networks to output learning results and through the integration and learning of data for accuracy.

The global neural network part 125 derives learning results regarding the shooting accuracy and shooting hit rate of each of the shooting systems 110 from the integration and learning of data and through the global neural network part's 125 layers ranging from the global input layer 1251a and 1252a to the global output layer 1251c and 1252c. Learning result data (also referred to as weight values) derived from the global neural network part 125 may be transmitted and downloaded to each of the shooting systems 110.

The shooting control algorithm 131 and the shooting prediction algorithm 132 may be considered as algorithms for allowing the local neural network part 115 and the global neural network part 125 of the integrated computer 120 to download data from each other in real time, for improving shooting accuracy through shooting control, and for predicting shooting hit rate.

Data learned through the shooting control algorithm 131 and the shooting prediction algorithm 132 may be reflected in real-time shooting of each of the shooting systems 110.

The shooting control learning algorithm 131 may include a shooting control local neural network part 131a and a shooting control global neural network part 131b.

The shooting control local neural network part 131a may be provided in each of the shooting systems 110, and data for shooting control may be input to the shooting control local neural network part 131a.

The shooting control global neural network part 131b may be provided in the integrated computer 120 and may be configured to receive data from the shooting control local neural network part 131a for learning. The shooting control global neural network part 131b may be configured to extract the learning result data R1 and R2.

Data learned and updated through the shooting control algorithm 131 may be reflected in each of the shooting systems 110, which enables the update of the corresponding data and thereby enhancing shooting accuracy.

Specifically, the shooting control algorithm 131 may receive at least one shooting ballistics-related data including tracking image data, raw data among the tracking image data, distance data, ballistic correction angle data, N-axis motor position data, navigation data, gyro data, and ground surface condition information. The shooting control algorithm 131 receives both shooting ballistics-related data and updated data from the integrated computer 120, which allows real-time updating of each data to the latest version. The shooting control algorithm 131 may learn from current input information in the case of both successful and failed shootings conducted by each of the shooting systems 110.

Additionally, the more the input data and shooting result data is from each of the shooting systems 110, the higher the learning and accuracy of the integrated computer 120 can be. It may be difficult to conduct the learning algorithm 130 as many times (e.g., tens of thousands of times) as desired through shooting in each of the shooting systems 110. However, if data from at least one shooting systems 110 (particularly, from a plurality of shooting systems 110) is transmitted to the integrated computer 120, the integrated computer 120 may perform learning based on the data received from each of the shooting systems 110.

As mentioned above, when input data (including shooting ballistics data) for shootings and shooting result data after shooting are transmitted to the integrated computer 120, the integrated computer 120 performs learning through the shooting control global neural network part 131*b*. Learning result data learned from the integrated computer 120 may be transmitted to the shooting control local neural network part 131*a* of each of the shooting systems 110. Data in the shooting control local neural network part 131*a* is updated through received data, and as a result, the shooting accuracy of each of the shooting systems 110 may be improved in real time.

Data learned and updated through the shooting prediction learning algorithm 132 of the data algorithm 130 may be reflected each of the shooting systems 110, which enables the prediction of the shooting hit rate of each of the shooting systems 110 based on the posture, position, situation, and state of each of the shooting systems 110.

According to one or more embodiments, the shooting prediction algorithm 132 may include a shooting prediction local neural network part 132*a* and a shooting prediction global neural network part 132*b*.

The shooting prediction local neural network part 132*a* may be provided in the shooting systems 110, and data for shooting prediction may be input to the shooting prediction local neural network part 132*a*.

The shooting prediction global neural network part 132*b* may be provided in the integrated computer 120. The shooting prediction global neural network part 132*b* may receive data from the shooting prediction local neural network part 132*a*, perform learning, and extract learning result data.

Data learned and updated through the shooting prediction algorithm 132 may be reflected in each of the shooting systems 110, which enables the update of corresponding data and thus facilitates the prediction of shooting hit rate.

According to one or more embodiments, the shooting prediction algorithm 132 may receive at least one shooting ballistics-related data from one or more of tracking image data, distance data, ballistic correction angles, N-axis motor position data, navigation data, gyro data, and surface condition information. The shooting prediction algorithm 132 may also receive updated data from the integrated computer 120, enabling the real-time update of each data to the latest version. The shooting prediction algorithm 132 may learn from current input information in the case of both successful shootings and failed shootings conducted by each of the shooting systems 110. As a result of this learning, the shooting prediction algorithm 132 may predict the shooting hit rate of each of the shooting systems 110 based on the posture, position, situation, and status of each of the shooting systems 110.

It may be difficult to conduct learning by executing the learning algorithm 130 as many times (e.g., tens of thousands of times) as desired through shooting in each of the shooting systems 110. However, if data from at least one shooting systems 110 (particularly, from a plurality of shooting systems 110) is transmitted to the integrated computer 120, the integrated computer 120 can perform learning based on the data received from each of the shooting systems 110. Moreover, the shooting prediction algorithm 132 can predict the shooting hit rate of each of the shooting systems 110 based on the posture, position, situation, and status of each of the shooting systems 110. Each of the shooting systems 110 may include a ballistic state, a posture status, position status, situation status, deployment status, and ballistic correction angle status. All of which may be based on the real-time surrounding data.

According to one or more embodiments, each of the shooting systems 110 is equipped with the shooting prediction local neural network part 132*a*, and the integrated computer 120 is equipped with the shooting prediction global neural network part 132*b*. Thus, when the shooting prediction local neural network part 132*a* in each of the shooting systems 110 sends shooting result data to the integrated computer 120, the shooting prediction global neural network part 132*b* in the integrated computer 120 performs learning based on the data sent from the shooting prediction local neural network part 132*a*. The learning result data R1 and R2 generated by the shooting prediction global neural network part 132*b* are then transmitted back to each of the shooting systems 110. The learning result data R1 and R2 generated by the shooting prediction global neural network part 132*b* may be updated data values. At a particular point upon completion of learning, the shooting systems 110 can predict the shooting hit rate of each shooting system 100 in the current situation under the current conditions and can provide the results of the prediction to the operator of each of the shooting systems 110.

Figure 3:
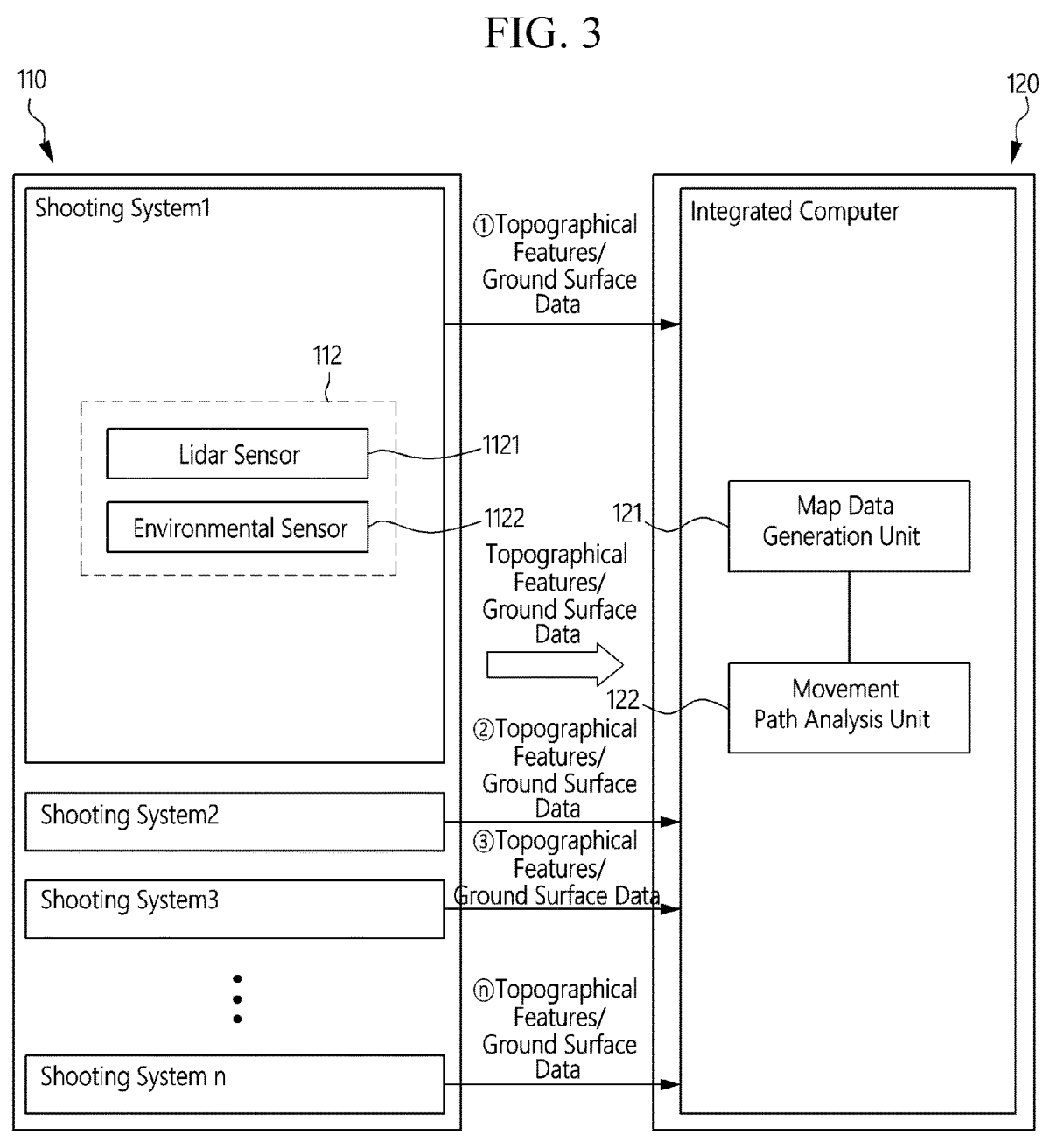

FIG. 3 is a schematic configuration view illustrating generation of surrounding environment information by a map data generation unit 121 and generation and analysis of a movement path by a movement path analysis unit 122 through a sensor 112 according to one or more embodiments.

Referring to FIG. 3, the shooting systems 110 may be equipped with the sensor 112, which detects a surrounding environment of the shooting systems 110. The sensor 112 may include a light detection and ranging (LiDAR) sensor 1121 and an environmental sensor 1122 which may include at least one of camera, temperature sensor, humidity sensor, or so on. The integrated computer 120 may also include the map data generation unit 121, which receives information from the LiDAR sensor 1121 and the environmental sensor 1122 to generate surrounding environment information ranging up to a target and a movement path analysis unit 122, and generate and analyze a movement path to a target point based on the surrounding environment information generated by the map data generation unit 121.

Surrounding environment data of the shooting systems 110, detected by the LiDAR sensor 1121 and the environmental sensor 1122, and the position information about the shooting systems 110 are transmitted to the integrated computer 120 to generate the surrounding environment information by the map data generation unit 121 for the shooting systems 110 and the target point. Moreover, the path analysis unit 122 may analyze an optimal shooting position and the movement path for the shooting system 110 by performing learning of data transmitted from the shooting systems 110.

In the map data generation unit 121, at least one movement path between the shooting systems 110 and the target point may be generated and displayed. For this purpose, the map data generation unit 121 may include a display module or connected to the display module. At least one information from among shooting position information, terrain information, predicted shooting hit rate information, and estimated travel time to the target point for whether the shooting systems 110 are moving or stationary may be displayed on the movement path.

According to one or more embodiments, a plurality of shooting systems 110 that are configured to be movable are equipped with the LiDAR sensor 1121 and the environmental sensor 1122. Surrounding environment data input to the LiDAR sensor 1121 and the environmental sensor 1122, such as topographical features and ground surface information, may be transmitted to the integrated computer 120, together with current position information of the shooting systems 110. The integrated computer 120 may analyze the surrounding environment data received from the shooting systems 110 and may generate the surrounding environment information based on the results of the analysis. The surrounding environment information may be used to find an optimal shooting position through the analysis of the movement path during the movement of the shooting systems 110.

Figure 4A:
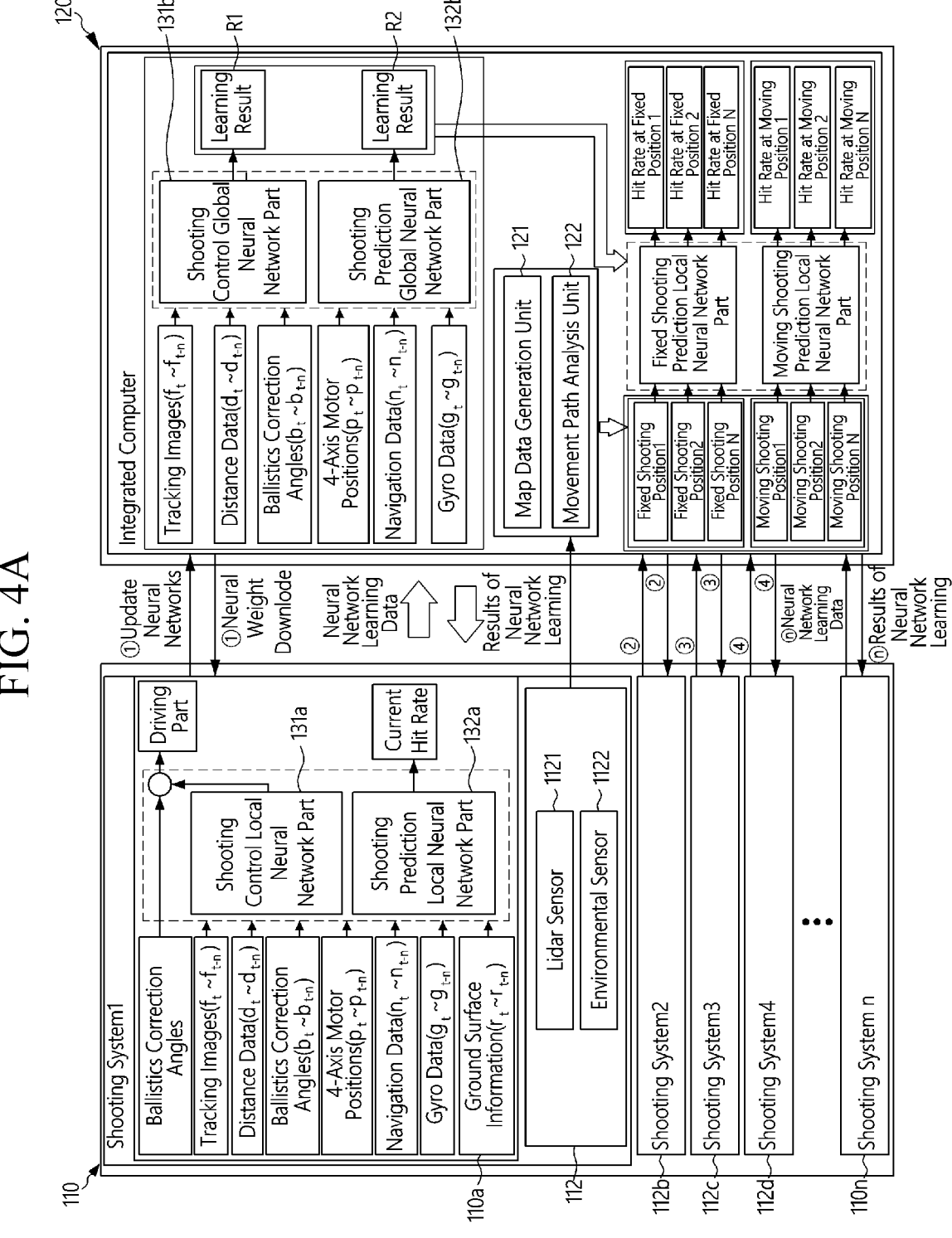
FIG. 4A is a schematic configuration view illustrating how to predict shooting accuracy and shooting hit rate at a fixed or moving position through the data algorithm, the map data generation unit, and the movement path analysis unit of the system according to one or more embodiments.
Figure 4B:
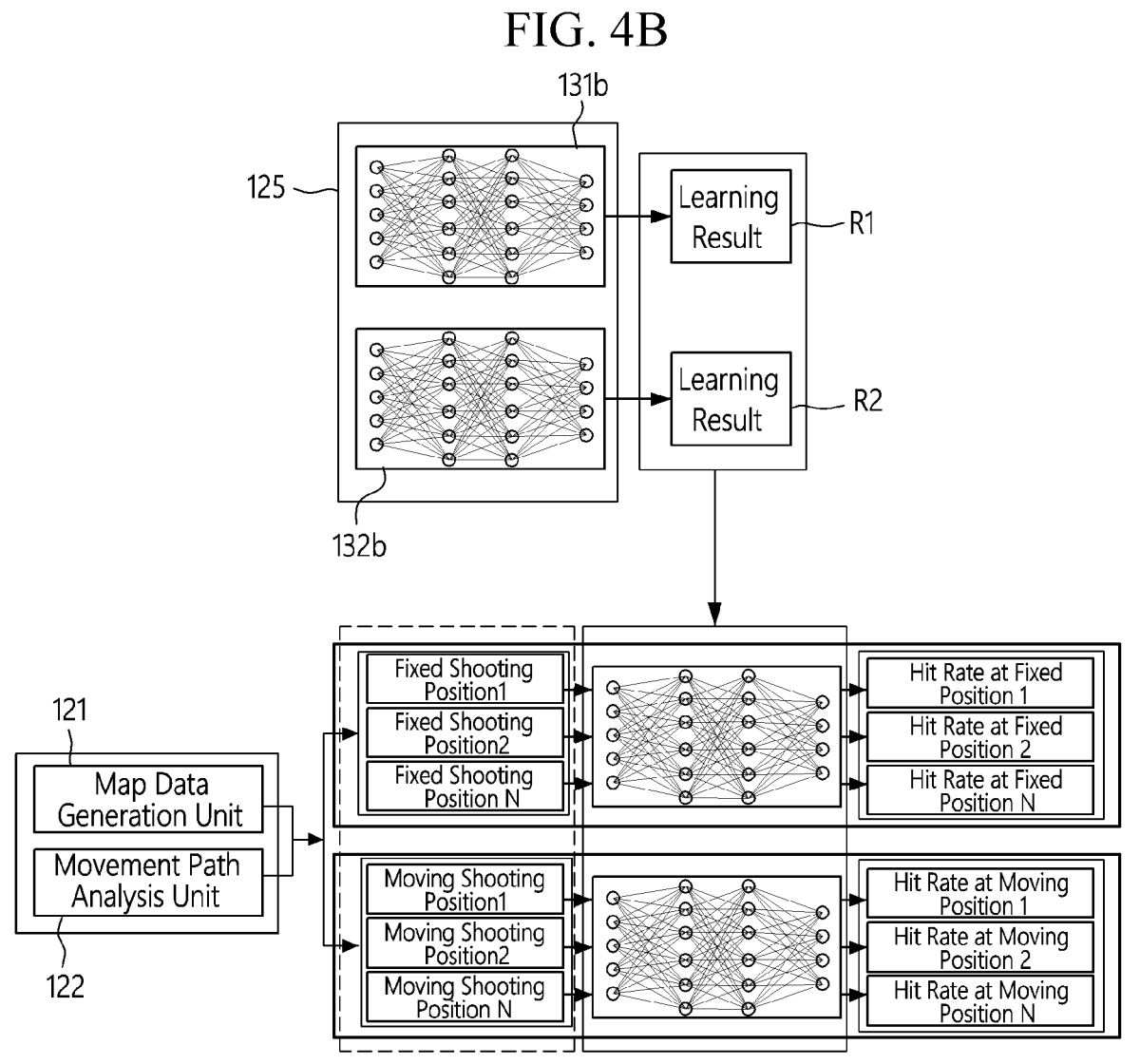
Figure 4C:
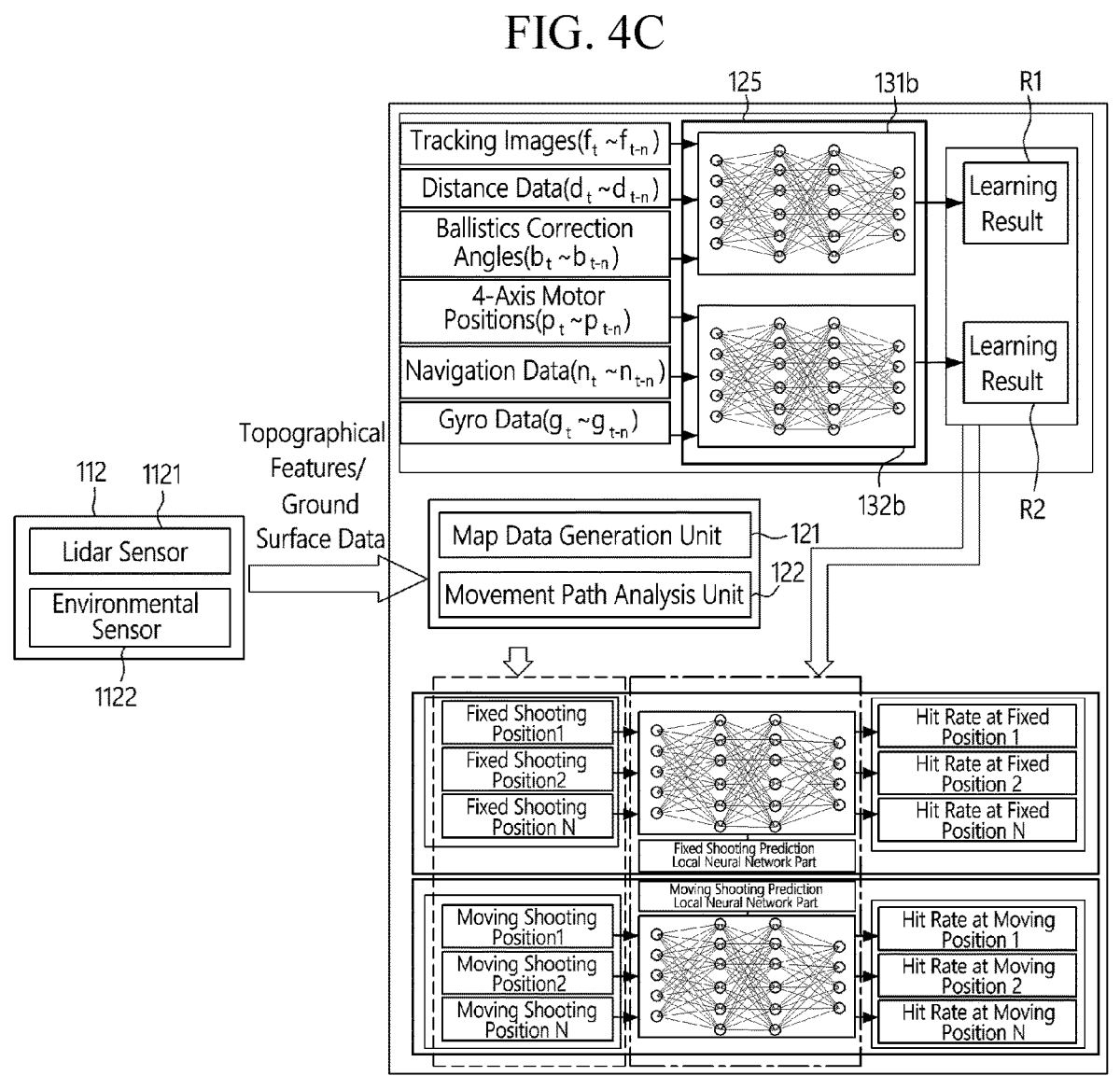
Figure 5:
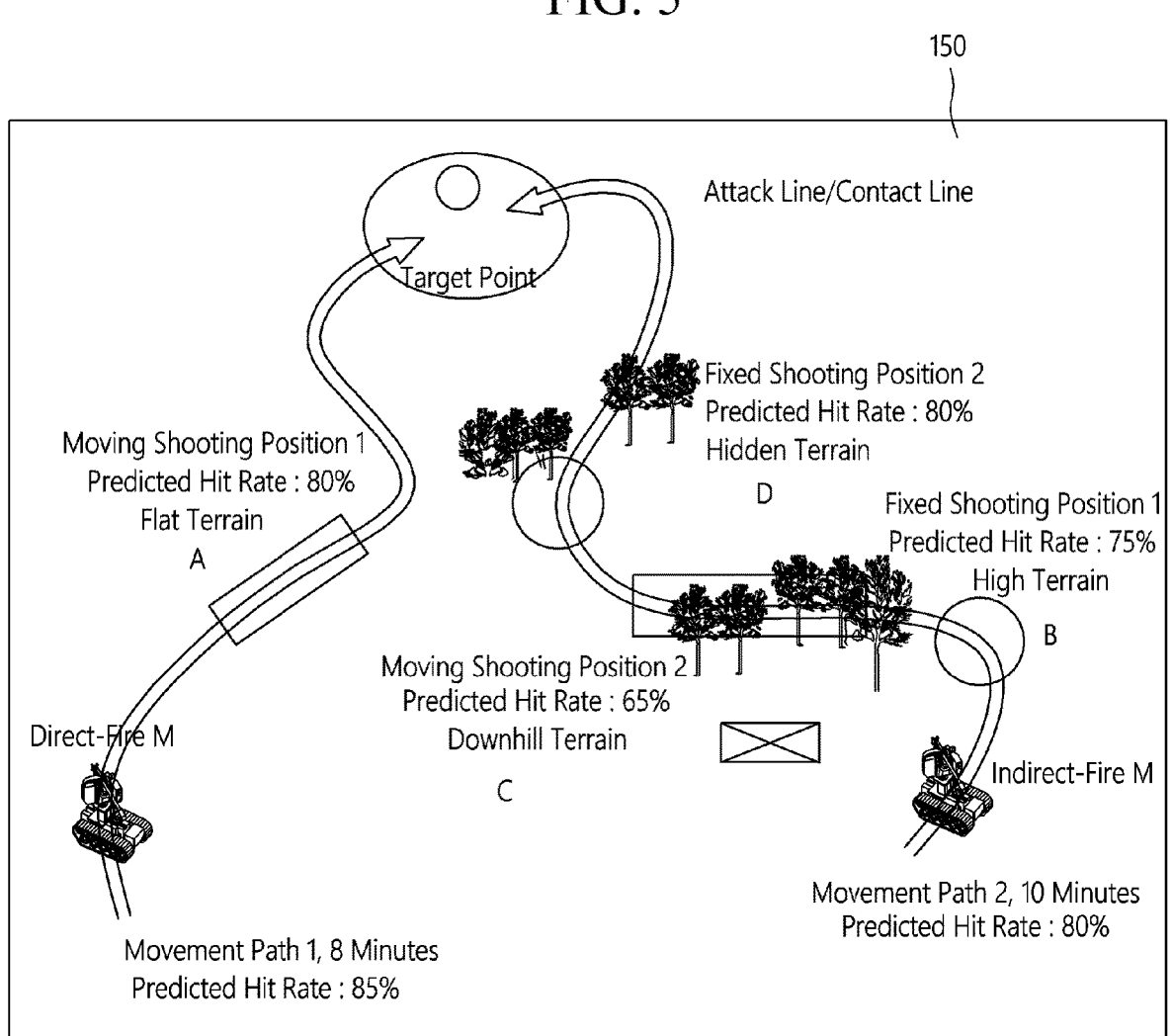
FIG. 5 is a drawing illustrating how to display a movement path in the map data generation unit and a predicted shooting hit rate and terrain information for each shooting system at a shooting position according to one or more embodiments.

FIG. 4A is a schematic configuration view illustrating how to predict a shooting accuracy and a shooting hit rate at a fixed or moving position through the data algorithm 130, the map data generation unit 121, and the movement path analysis unit 122 of the system 100 according to one or more embodiments. FIG. 4B is a drawing illustrating how the integrated computer 120 of the system 100 predicts shooting hit rate at a fixed or moving position of each of the shooting systems 110 according to one or more embodiments. FIG. 4C is a drawing illustrating how the integrated computer 120 of the system 100 derives result data using the global neural network part 125 and the local neural network part 115 according to one or more embodiments. FIG. 5 is a drawing illustrating how to display a movement path in the map data generation unit 121 and a predicted shooting hit rate and terrain information for each of the shooting systems 110 at a shooting position according to one or more embodiment.

Referring to FIGS. 4A through 5, the target point may be determined to initiate shooting. Once the target point is determined, each of the shooting systems 110 may perform shooting prediction and the generation of a movement path for shooting aimed at the target point or for moving to the target point. According to one or more embodiments and with reference to FIG. 3, the integrated computer 120 may generate at least one movement path for each of the shooting systems 110 through real-time input and the stored surrounding environment information. Also, data is input, learned, and transmitted for updates through the shooting prediction algorithm 132. For paths 1 through n generated by the map data generation unit 121, position data for each position and at least one corresponding shooting ballistics-related virtual data may be input to the shooting prediction local neural network part 132*a*. These input data may be transmitted to the integrated computer 120. The shooting prediction global neural network part 132*b* performs learning of the data received from the integrated computer 120 and transmits the results of the learning back to the shooting prediction local neural network part 132*a*. The shooting prediction local neural network part 132*a* updates data with the result data received from the shooting prediction global neural network part 132*b*. Then, the shooting prediction local neural network part 132*a* improves the shooting accuracy of each of the shooting systems 110 and predicts the shooting hit rate of each shooting system 110 using the latest updated data. Additionally, prediction results may be displayed at corresponding position points in the map data generation unit

121, and for particular position points, information indicating whether the positions are with clear sightlines, predicted higher hit rates expected due to the roads being flat or with high ground advantageous for shooting, may be marked on the map and may be transmitted and displayed to be identified by the operator of each of the shooting systems 110.

In a case where a direct-fire M shooting system 110 and an indirect-fire M shooting system 110 moves to the target point and performs shooting at the target point, the map data generation unit 121 generates a map up to the target point, the movement path analysis unit 122 analyzes the movement paths for both the direct-fire M shooting system 110 and the indirect-fire M shooting system 110, and the generated paths may be displayed in the map data generation unit 121.

Furthermore, for selected or input position points or analyzed position points along the movement paths for the direct-fire M shooting system 110 and the indirect-fire M shooting system 110 may result data such as travel time, terrain information, and shooting hit rates, derived through analysis by the data algorithm 130 and the map data generation unit 121. The result data may be displayed in the map data generation unit 121 to be identified by the operators of the direct-fire M shooting system 110 and the indirect-fire M shooting system 110.

As mentioned earlier, the integrated computer 120 may generate, and display on the display module, a movement path between the position of each of the shooting systems 110 and the target point and calculate one or more areas (i.e. terrains) on the movement path, such as a flat terrain A, a high terrain B, a downhill terrain C, and a hidden terrain D. The shooting prediction local neural network part 132*a* may learn shooting hit rates for the terrains A, B, C, and D, upgrade the corresponding data, transmit the results of the calculation to the operator of each of the shooting systems 110, and display the results of the calculation in the map data generation unit 121. Shooting hit rates may be predicted as the percentage of how often the target point may be shot, for example, the shooting hit rates may be predicted to be 85%, 75%, 65%, and 80% for the terrains A, B, C, and D, respectively. The map data generation unit 121 may be shared with the operator of each of the shooting systems 110, and such shared data may be displayed in the map data generation unit 121, showing the calculated shooting hit rates and terrain information for the respective positions for the operator of each of the shooting systems 110 to verify.

FIG. 6 is a schematic flowchart illustrating a method of improving shooting accuracy according to an one or more embodiments.

Referring to FIG. 6, the method of improving shooting accuracy according to one or more embodiments may include the steps of: receiving a target point (S10), inputting input data and shooting result data to each of the shooting systems 110 (S20), transferring data to the integrated computer 120 (S30), implementing learning data (S40), transmitting learning result data to each of the shooting systems 110 (S50), and performing an update (S60).

Specifically, the target point may be received first (step S10).

Thereafter, the surrounding environment information may be generated for each of the shooting systems 110 in relation to the target point (S15) and displayed on the display module.

Surrounding environment data for the current position of each of the shooting systems 110 may be collected through the LiDAR sensor 112 of each of the shooting systems 110 as a surrounding environment data collection step.

After collecting the surrounding environment data, the surrounding environment information for each of the shooting systems 110 and a movement path to the target point may be generated in the integrated computer 120, using the surrounding environment data (S15).

Upon receiving the target point, at least one data for shooting at the target point, such as, at least one shooting ballistics-related data, may be received from each of the shooting systems 110, and after shooting at the target point from each shooting system 110, the shooting result data may be received in real time from each of the shooting systems 110 (S20).

Thereafter, the input data and the shooting result data from each of the shooting systems 110 may be transferred to the integrated computer 120 (S30).

Thereafter, the integrated computer 120 may receive the input data and the shooting result data and store and learn the received data through the shooting control global neural network part 131*b* and the shooting prediction global neural network part 132*b*, thereby implementing learning data for shooting control and for shooting prediction (S40).

Thereafter, the learning data of the integrated computer 120 may be transmitted to each of the shooting systems 110 (S50).

Thereafter, data of each of the shooting systems 110 may be updated, and the learning data may be reflected in each of the shooting systems 110 in real time (S60).

Thereafter, at least one information from among shooting position information, terrain information, predicted shooting hit rate information, and estimated travel time to the target point for whether each of the shooting systems 110 is stationary or moving may be displayed in a location of at least one point on the movement path in the map data generation unit 121 (S70).

According to one or more embodiments, when input data for shootings conducted toward a shooting target point through multiple shooting systems and shooting result data regarding the conducted shootings are transmitted to an integrated computer, the integrated computer proceeds with learning through a global neural network part for shooting control, and transmits the results of the learning to the local neural network part so that the shooting accuracy of the shooting systems can be improved in real time by the local neural network part.

Furthermore, learning conducted through the global neural network part for shooting control allows for the prediction of the shooting hit rate in various conditions such as the posture, position, situation, and state of the shooting systems. Learning conducted through the global neural network part for shooting control enables the prediction of the shooting hit rate of the multiple shooting systems. Therefore, the operator can predict the shooting hit rate of a desired shooting system among the multiple shooting systems and choose a higher shooting accuracy based on the results of the prediction.

Additionally, information such as environmental data, terrain information, and shooting hit rates along the movement path of each operational shooting system to a target object can be predicted, and the operator can receive and identify the predicted information and can conduct optimal shooting based on the predicted information.

Moreover, data detected through a detection unit (such as a Light Detection and Ranging (LiDAR) sensor) including topographical features and ground surface information, is transmitted along with position information of each shooting system to the integrated computer. Then, the integrated computer generates map data through the detected data from the multiple shooting systems and provides an optimal shooting position through path analysis as each operational shooting systems moves.

The term "system," "computer," "network," "network part," and "layer" may include a unit implemented in hardware, software, or firmware, and may interchangeably be used with other terms, for example, "logic," "block," "part," or "circuitry". A system may be a single integral component, or a minimum unit or part thereof, adapted to perform one or more functions. According to one or more embodiments, the system may be implemented in a form of an application-specific integrated circuit (ASIC).

An embodiment as set forth herein may be implemented as software (e.g., the shooting systems 110, integrated computer 120) including one or more instructions that are stored in a storage medium (e.g., memory) that is readable by a machine (e.g., the system 100). According to one or more embodiments, a processor (e.g., the processor) of the machine (e.g., the system 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Each component (e.g., a shooting system) of the above-described components may include a single entity or multiple entities. One or more of the above-described components may be omitted, or one or more other components may be added. Alternatively or additionally, a plurality of components (e.g., the shooting systems) may be integrated into a single component. According to one or more embodiments, the integrated component may perform one or more functions of each of the plurality of components in the same or similar manner as they are performed by a corresponding one of the plurality of components before the integration.

According to one or more embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to one or more embodiments, it will be understood that the one or more embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiments described herein may be used in conjunction with any other embodiments described herein.

What is claimed is:

1. A system comprising:
  a shooting system comprising at least one first processor configured to:
    receive shooting ballistics-related data and shooting result data in real time, and detect real-time surrounding data; and an integrated computer comprising at least one second processor configured to:

receive the shooting ballistics-related data and the shooting result data from the shooting system, implement a global neural network to derive learning result data based on the shooting ballistics-related data and the shooting result data, and transmit the learning result data to the shooting system, wherein the at least one first processor implements a local neural network configured to store and derive shooting control data and shooting prediction data based on the shooting ballistics-related data, the shooting result data, and the learning result data, wherein the at least one second processor is further configured to implement the global neural network to update the learning result data based on the shooting ballistics-related data and the shooting result data received from the shooting system, wherein the at least one second processor is further configured to transmit the updated learning result data to the shooting system, wherein the at least one first processor is further configured to update the shooting ballistics-related data based on the updated learning result data received from the integrated computer, and wherein the at least one first processor is further configured to update the shooting control data and the shooting prediction data of the local neural network based on the updated learning result data received from the integrated computer.

2. The system of claim 1, wherein the at least one second processor is further configured to implement learning based on the shooting ballistics-related data and the shooting result data received from the shooting system, and wherein the learning implemented by the at least one second processor comprises shooting control learning for enhancing a shooting accuracy of the shooting system and shooting prediction learning for enhancing a real-time shooting hit rate of the shooting system.

3. The system of claim 2, wherein the shooting prediction learning of the shooting system comprises a ballistic state of the shooting system and a posture status, position status, situation status, deployment status, and ballistic correction angle status of the shooting system based on the real-time surrounding data.

4. The system of claim 2, wherein the at least one first processor is further configured to:

increase the shooting accuracy toward a target point and predict the real-time shooting hit rate by updating the shooting ballistics-related data and the shooting result data with the updated learning result data received from the integrated computer, and transmit, to an operator, a prediction value data based on the updated shooting ballistics-related data and the updated shooting result data.

5. The system of claim 4, wherein the shooting system and the integrated computer both comprise a shooting control algorithm and a shooting prediction algorithm, wherein the receiving, transmitting, and updating of the shooting ballistics-related data, the shooting result data, and the learning result data by the shooting system and the integrated computer is done in real time, wherein the shooting control algorithm, of the shooting system and the integrated computer, is configured to perform the shooting control learning based on the receiving, transmitting, and updating the shooting ballistics-related data, the shooting result data, and the learning result data in real time, and wherein the shooting prediction algorithm, of the shooting system and the integrated computer, is configured to perform the shooting prediction learning based on the receiving, transmitting, and updating the shooting ballistics-related data, the shooting result data, and the learning result data in real time.

6. The system of claim 5, wherein the shooting control algorithm comprises:

a shooting control local neural network part, which is provided in the local neural network of the shooting system and to which the shooting control data is input, and a shooting control global neural network part, which is provided in the global neural network of the integrated computer, is configured to receive and learn from the shooting control data input to the shooting control local neural network part, and extract the learning result data, and wherein the shooting control algorithm is configured to update the shooting control data input to the shooting control global neural network part based on the learning result data and reflect the updated shooting control data in real time.

7. The system of claim 6, wherein the shooting system comprises a driving part configured to adjust the shooting of the shooting system, wherein the driving part is configured to be operated and controlled based on the updated shooting control data of the shooting control local neural network part and ballistic correction angle status of the shooting system, and wherein the shooting system is adjusted toward the target point according to the operation of the driving part.

8. The system of claim 6, wherein the shooting control data input to the shooting control local neural network part comprises at least one of tracking image data, raw data from among the tracking image data, distance data, ballistic correction angle data, N-axis motor position data, navigational data, gyro data, or ground surface condition information, wherein the shooting control local neural network part is configured to transmit the shooting control data, wherein the shooting control global neural network part comprises:

a global input layer configured to receive the raw data from the shooting control local neural network part, at least one global hidden layer, which is connected to the global input layer through a plurality of neural networks, and a global output layer, which is connected to the at least one global hidden layer through the plurality of neural networks, configured to learn the learning result data, which is based on the raw data, through the at least one global hidden layer, and output the learning result data to the at least one first processor, and wherein the at least one first processor is further configured to download the learning result data from the global output layer and update the learning result data as the raw data.

9. The system of claim 5, wherein the shooting prediction algorithm comprises:

a shooting prediction local neural network part, which is provided in the local neural network of the shooting system and to which the shooting prediction data is input; and a shooting prediction global neural network part, which is provided in the global neural network of the integrated computer, is configured to receive and learn from the shooting prediction data input to the shooting prediction local neural network part, and extract the learning result data, and wherein the shooting prediction algorithm is configured to update the shooting prediction data input to the shooting prediction global neural network part based on the learning result data and configured to reflect the updated shooting prediction data in real time.

10. The system of claim 9, wherein the shooting prediction data input to the shooting prediction local neural network part comprises at least one of tracking image data, raw data from among tracking image data, distance data, ballistic correction angle data, N-axis motor position data, navigational data, gyro data, or ground surface condition information, wherein the shooting prediction local neural network part is configured to transmit the shooting prediction data, wherein the shooting prediction global neural network part comprises:

a global input layer configured to receive the raw data from the shooting prediction local neural network part and store the raw data, at least one global hidden layer, which is connected to the global input layer through a plurality of neural networks, and a global output layer, which is connected to the at least one global hidden layer through the plurality of neural networks, configured to learn the learning result data, which is based on the raw data, through the at least one global hidden layer, and output the learning result data to the at least one first processor, and wherein the at least one first processor is further configured to download the learning result data from the global output layer and update the learning result data as the raw data.

11. The system of claim 1, wherein the shooting system further comprises a Light Detection and Ranging (LiDAR) sensor and an environmental sensor, which both are configured to detect surrounding environment data of the shooting system.

12. The system of claim 11, wherein the at least one second processor is configured to implement:

a map data generation unit configured to receive the surrounding environment data from the LiDAR sensor and generate surrounding environment information that ranges up to a target point, and a movement path analysis unit configured to generate and analyze at least one movement path of the shooting system to the target point based on the surrounding environment information generated by the map data generation unit.

13. The system of claim 12, wherein the at least one first processor is configured to transmit the surrounding environment data and position information about the shooting system to the integrated computer, wherein the at least one second processor is further configured to generate at least one path for the map data generation unit for the shooting system and the surrounding environment of the target point, and wherein the movement path analysis unit is configured to analyze the at least one movement path for the shooting system and analyze an optimal shooting position based on the learning result data received from the shooting system.

14. The system of claim 11, wherein the at least one second processor is further configured to implement a map data generation unit configured to generate at least one movement path between the shooting system and a target point, and wherein the at least one movement path comprises at least one of shooting position information, terrain information, predicted shooting hit rate information, or estimated travel time to the target point based on whether the shooting system is moving or stationary.

15. A method of improving a shooting accuracy and predicting a shooting hit rate in a system comprising a shooting system and an integrated computer, comprising:

receiving a target point;

receiving, in real time by the shooting system, data for shooting at the target point, the data comprising shooting ballistics-related data and shooting result data;

detecting, by the shooting system, real-time surrounding data;

transmitting the data for shooting at the target point received by the shooting system and the real-time surrounding data to the integrated computer;

deriving, by a global neural network implemented in the integrated computer, a learning result data for shooting control and shooting prediction by learning the data for shooting at the target point transmitted to the integrated computer;

transmitting, by the integrated computer, the learning result data from the integrated computer to the shooting system;

storing and deriving, by a local neural network implemented in the shooting system, shooting control data and shooting prediction data based on the shooting ballistics-related data, the shooting result data, and the learning result data;

updating, by the integrated computer, the learning result data based on the shooting ballistics-related data and the shooting result data received from the shooting system;

transmitting, by the integrated computer, the updated learning result data from the integrated computer to the shooting system;

updating, by the shooting system, the data for shooting at the target point transmitted by the shooting system based on the learning result data and reflecting the updated data in the shooting system in real time; and updating, by the shooting system, the shooting control data and the shooting prediction data of the local neural network based on the updated learning result data received from the integrated computer.

16. The method of claim 15, further comprising, after the receiving the target point, collecting, by a Light Detection and Ranging (LiDAR) sensor of the shooting system, surrounding environment data for a current position of the shooting system; and generating, by the integrated computer and based on the surrounding environment data, at least one movement path for the shooting system and analyzing the at least one movement path to the target point.

17. The method of claim 15, further comprising, after the updating the data for shooting at the target point transmitted by the shooting system and the reflecting the updated data for shooting at the target point in the shooting system in real time, displaying, on the at least one movement path, at least one of shooting position information, terrain information, predicted shooting hit rate information, or estimated travel time to the target point based on whether the shooting system is moving or stationary.

18. The method of claim 15, further comprising:

reflecting the updated data in the shooting system in real time.

19. The method of claim 18, wherein the shooting ballistics-related data and the shooting result data comprise a ballistic state of the shooting system and a posture status, position status, situation status, deployment status, and ballistic correction angle status of the shooting system based on the real-time surrounding data.

20. The method of claim 15, wherein the learning result data for shooting control and shooting prediction comprises at least one of tracking image data, raw data from among the tracking image data, distance data, ballistic correction angle data, N-axis motor position data, navigational data, gyro data, or ground surface condition information.

\* \* \* \* \*